United States Patent
Wang et al.

(10) Patent No.: US 6,353,054 B1
(45) Date of Patent: Mar. 5, 2002

(54) ALKENYL-CO-MALEIMIDE/DIENE RUBBER COPOLYMERS AND APPLICATIONS

(75) Inventors: Xiaorong Wang, Akron; Edward D. Kelley, Tallmadge, both of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/628,767

(22) Filed: Jul. 31, 2000

(51) Int. Cl.$^7$ .............................. C08G 73/10; C08F 8/32
(52) U.S. Cl. .............................. 525/66; 525/69; 525/70; 525/73; 525/259; 525/327.6
(58) Field of Search .............................. 525/66, 69, 70, 525/73, 259, 327.6

(56) References Cited

U.S. PATENT DOCUMENTS

| | | |
|---|---|---|
| 2,725,367 A | 11/1955 | Niederhauser et al. |
| 2,971,934 A | 2/1961 | Brown et al. |
| 3,244,664 A | 4/1966 | Zelinski et al. |
| 3,281,383 A | 10/1966 | Zelinski et al. |
| 3,297,654 A | 1/1967 | Barr et al. |
| 3,414,551 A | 12/1968 | Reid et al. |
| 3,428,596 A | 2/1969 | Strand et al. |
| 3,480,580 A | 11/1969 | Joyner et al. |
| 3,481,910 A | 12/1969 | Brunson et al. |
| 3,492,227 A | 1/1970 | Kolaian |
| 3,528,936 A | 9/1970 | Kent et al. |
| 3,577,365 A | 5/1971 | Folzenlogen et al. |
| 3,594,452 A | 7/1971 | De La Marre et al. |
| 3,751,378 A | 8/1973 | Cowperthwaite et al. |
| 3,761,458 A | 9/1973 | Holler et al. |
| 3,796,687 A | 3/1974 | Collette et al. |
| 3,840,449 A | 10/1974 | Furukawa et al. |
| 3,862,265 A | 1/1975 | Steinkamp et al. |
| 3,970,608 A | 7/1976 | Furukawa et al. |
| 3,985,830 A | 10/1976 | Fetters et al. |
| 3,998,907 A | 12/1976 | Di Giulio |
| 4,015,612 A | 4/1977 | Pavlik et al. |
| 4,017,669 A | 4/1977 | Collette et al. |
| 4,087,485 A | 5/1978 | Huff |
| 4,104,241 A | 8/1978 | Roberts et al. |
| 4,104,332 A | 8/1978 | Zelinksi |
| 4,132,531 A | 1/1979 | Cummings et al. |
| 4,139,417 A | 2/1979 | Marie et al. |
| 4,151,336 A | 4/1979 | Sackmann et al. |
| 4,151,337 A | 4/1979 | Kanoh et al. |
| 4,287,314 A | 9/1981 | Fava |
| 4,304,886 A | 12/1981 | Bean et al. |
| 4,374,951 A | 2/1983 | Lee et al. |
| 4,404,321 A | 9/1983 | Abolins et al. |
| 4,404,322 A | 9/1983 | Saito et al. |
| 4,408,010 A | 10/1983 | Le-Khac |
| 4,423,196 A | 12/1983 | Arlt et al. |
| 4,427,828 A | 1/1984 | Hergenorother et al. |
| 4,502,229 A | 3/1985 | Kitzman |
| 4,506,056 A | 3/1985 | Gaylord |
| 4,540,753 A | 9/1985 | Cozewith et al. |
| 4,585,824 A | 4/1986 | Uchida et al. |
| 4,605,700 A | 8/1986 | Le-Khac |
| 4,683,275 A | 7/1987 | Kato et al. |
| 4,728,463 A | 3/1988 | Sutker et al. |
| 4,732,928 A | 3/1988 | Mizushiro et al. |
| 4,735,992 A | 4/1988 | Nogues |
| 4,771,097 A | 9/1988 | Sackmann et al. |
| 4,772,657 A | 9/1988 | Akiyama et al. |
| 4,889,896 A | 12/1989 | Canova et al. |
| 4,893,055 A | 1/1990 | Fuzzi et al. |
| 4,912,144 A | 3/1990 | McCready |
| 4,921,910 A | 5/1990 | Lunt et al. |
| 4,931,502 A | 6/1990 | McCready |
| 4,996,262 A | 2/1991 | Pyke et al. |
| 5,008,324 A | 4/1991 | Killgoar, Jr. et al. |
| 5,034,449 A | 7/1991 | Mallikarjun |
| 5,037,924 A | 8/1991 | Tazi et al. |
| 5,082,913 A | 1/1992 | Tazi et al. |
| 5,122,161 A | 6/1992 | Benfaremo et al. |
| 5,126,403 A | 6/1992 | Graiver et al. |
| 5,156,920 A | 10/1992 | Aycock et al. |

(List continued on next page.)

FOREIGN PATENT DOCUMENTS

| | | |
|---|---|---|
| AU | B-47913/85 | 4/1986 |
| CA | 702610 | 1/1965 |
| DE | 3430802 A1 | 3/1986 |
| DE | 42 25 875 A1 | 2/1994 |
| DE | 42 39437 A1 | 5/1994 |
| DE | 42 41 538 A1 | 6/1994 |

(List continued on next page.)

OTHER PUBLICATIONS

L.E. Colleman, Jr., J.F. Bork, and H. Donn, Jr., J. Org. Chem., 24, 185 (1959) Reaction of Primary Alphatle Amines with Maleic Anhydride.

A. Matsumoto, Y. Oki, and T. Otsu, Polymer J., 23(3), 201 (1991). Sythesis, Thermal Properties and Gas permeability of Poly(N–n–alkylmalemide)s.

L. Haeussler, U. Wienhold, V. Albrecht, and S. Zschoche, Thermochim. Acta, 277, 14(1996). Simultaneous TA and MS analysis of Alternating Styrene–Maleic Anhydride and Styrene–Malemide Copolymers.

W. Kim and K. Seo Macromol. Rapid Commun., 17, 835(1996). Synthesis and Photocrosslinking of Maleimide –Type Polymers.

(List continued on next page.)

Primary Examiner—James J. Seidleck
Assistant Examiner—Olga Asinovsky
(74) Attorney, Agent, or Firm—David G. Burleson; Ann M. Skerry

(57) ABSTRACT

The present invention is generally directed to a process for forming a diene-rubber grafted centipede polymer. The process includes copolymerizing a copolymer comprising a maleimide and at least one block chosen from the group consisting of vinyl aromatic hydrocarbons, $R^1R^2$ethylenes, or alkyl vinyl ethers with an amine. The amine is further functionalized with at least one functional group capable of grafting to a diene rubber. The copolymer is cocured with a diene rubber to form the diene-rubber grafted centipede polymer.

25 Claims, No Drawings

U.S. PATENT DOCUMENTS

| | | |
|---|---|---|
| 5,202,384 A | 4/1993 | Pyke et al. |
| 5,212,227 A | 5/1993 | Sakazume et al. |
| 5,219,628 A | 6/1993 | Hathaway et al. |
| 5,225,498 A | 7/1993 | Sorathia et al. |
| 5,244,971 A | 9/1993 | Jean-Marc |
| 5,300,569 A | 4/1994 | Drake et al. |
| 5,318,854 A | 6/1994 | Hamersma et al. |
| 5,356,953 A | 10/1994 | Harada et al. |
| 5,373,048 A | 12/1994 | Witzeman et al. |
| 5,414,044 A | 5/1995 | Moriya et al. |
| 5,432,662 A | 7/1995 | Kato et al. |
| 5,472,741 A | 12/1995 | Sackmann et al. |
| 5,489,657 A | 2/1996 | Sue et al. |
| 5,494,964 A | 2/1996 | Meichsner et al. |
| 5,494,981 A | 2/1996 | Gorodisher et al. |
| 5,532,317 A | 7/1996 | Shinmura et al. |
| 5,536,774 A | 7/1996 | Segatta et al. |
| 5,548,031 A | 8/1996 | Doi |
| 5,585,434 A | 12/1996 | DeNicola Jr. et al. |
| 5,585,436 A | 12/1996 | Niessner et al. |
| 5,602,200 A | 2/1997 | Wissmann |
| 5,618,881 A | 4/1997 | Hojabr |
| 5,634,122 A | 5/1997 | Loucks et al. |
| 5,637,410 A | 6/1997 | Bonner et al. |
| 5,651,927 A | 7/1997 | Auda et al. |
| 5,652,307 A | 7/1997 | Niessner et al. |
| 5,654,364 A | 8/1997 | Bates et al. |
| 5,655,820 A | 8/1997 | Kervagoret |
| 5,658,985 A | 8/1997 | Eichenauer et al. |
| 5,665,820 A | 9/1997 | Liestner et al. |
| 5,670,006 A | 9/1997 | Wilfong et al. |
| 5,684,122 A | 11/1997 | Inoue et al. |
| 5,691,411 A | 11/1997 | Khouri et al. |
| 5,710,228 A | 1/1998 | Krause et al. |
| 5,776,234 A | 7/1998 | Schilling |
| 5,783,630 A | 7/1998 | Evans et al. |
| 5,798,413 A | 8/1998 | Spelthann et al. |
| 5,798,414 A | 8/1998 | Mishima et al. |
| 5,821,032 A | 10/1998 | DoMinh |
| 5,912,296 A | 1/1999 | Wang et al. |
| 5,869,695 A | 2/1999 | Ulmer et al. |
| 5,883,188 A | 3/1999 | Hwang et al. |
| 5,905,116 A | 5/1999 | Wang et al. |
| 5,965,666 A | 10/1999 | Koo et al. |
| 6,048,930 A * | 4/2000 | Wang et al. .................. 525/66 |

FOREIGN PATENT DOCUMENTS

| | | |
|---|---|---|
| EP | 0 177 401 A1 | 4/1986 |
| EP | 0322 905 A2 | 7/1989 |
| EP | 0 408 470 A1 | 1/1991 |
| EP | 0 440 922 A1 | 8/1991 |
| EP | 0 536 753 A1 | 4/1993 |
| EP | 0 728 767 A1 | 8/1996 |
| GB | 922151 | 3/1963 |
| JP | 6-248017 | 9/1954 |
| JP | 60-243102 | 12/1985 |
| JP | 6-56921 | 3/1994 |
| JP | 8-255901 | 10/1996 |
| WO | WO 96/23007 | 8/1996 |
| WO | WO 97/00898 | 1/1997 |

OTHER PUBLICATIONS

W. Lee, and G. Hwong, J. Appl. Polym. Sci., 59, 599 (1996). Polysulfobetaines and Corresponding Cationic Polymers. IV. Synthesis and Aqueous Solution Properties of Cationic Poly (MIQSDMAPM).

I. Vermeesch, and G. Groeninckx, J. Appl. Polym. Sci., 53, 1365(1994), Chemical Modification of Poly(styrene–co–maleic anhydride) with Primary N–Alkylamines by Reactive Extrusion.

* cited by examiner

ALKENYL-CO-MALEIMIDE/DIENE RUBBER COPOLYMERS AND APPLICATIONS

FIELD OF THE INVENTION

The present invention relates to poly(alkenyl-co-maleimide) polymers and to the use of such polymers as cocurable compositions with diene rubbers, producing high damping additives for use in rubber compositions.

BACKGROUND OF THE INVENTION

Imidization between a maleic anhydride and a primary amine group is a known chemical reaction. The synthesis of monofunctional N-alkyl and N-aryl maleimides is also known. They have been used to improve the heat stability of homo- and copolymers prepared from vinyl monomers. Typically, the bulk resins include ABS -poly(acrylonitrile-co-butadiene-co-styrene); SAN—a polyblend of poly (acrylonitrile-co-butadiene) and poly(styrene-co-acrylonitrile); poly(vinyl chloride), poly(styrene-co-acrylonitrile); poly(methyl methacrylate); or the like. The maleimides can be copolymerized with other monomers such as acrylonitrile, butadiene, styrene, methyl methacrylate, vinyl chloride, vinyl acetate and many other comonomers. An alternative practice is to produce copolymers of maleimides with other monomers such as styrene and optionally acrylonitrile, and to blend these with ABS and SAN resins. In any event, the polymer compositions are adjusted so that the copolymers are fully compatible with the bulk resins (e.g., ABS and/or SAN) as shown by the presence of a single glass transition point ($T_g$) as determined by DSC.

Two or more polymers may be blended together to form a wide variety of random or structured morphologies to obtain products that potentially offer desirable combinations of characteristics. However, obtaining many potential combinations through simple blending may be difficult or even impossible in practice. Frequently, the two polymers are thermodynamically immiscible, which precludes generating a truly homogeneous product. This immiscibility is not always a problem since it can be desirable to have a two-phase structure. However, the situation at the interface between these two phases often leads to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during processing or use. Poor adhesion leads, in part, to weak and brittle mechanical behavior often observed in dispersed blends and may render some highly structured morphologies impossible.

Provision of an extended grafted copolymer having the impact strength of polypropylene, the elastomeric properties of a block copolymer, high damping properties, and thermostability remains highly desirable.

SUMMARY OF THE INVENTION

The present invention is generally directed to a process for forming a diene-rubber grafted centipede polymer. The process includes copolymerizing a copolymer comprising a maleimide and at least one monomer unit chosen from the group consisting of vinyl aromatic hydrocarbons, $R^1R^2$ethylenes, or alkyl vinyl ethers with an amine. The amine is further functionalized with at least one functional group capable of grafting to a diene rubber. The copolymer is cocured with a diene rubber to form the diene-rubber grafted centipede polymer.

In one aspect of the present invention, a second amine, which is saturated, is reacted with the copolymer comprising a maleimide and at least one monomer unit chosen from the group consisting of vinyl aromatic hydrocarbons, $R^1R^2$ethylenes, or alkyl vinyl ethers. The copolymer is then reacted with the first amine.

In another aspect of the present invention, a co-curable rubber composition comprising a diene rubber/and a copolymer is provided. The copolymer includes at least one maleimide unit formed from the reaction of maleic ahydride with an unsaturated amine, and at least one monomer unit chosen from the group consisting of vinyl aromatic hydrocarbons, alkyl vinyl ethers, and $R^1R^2$ethylenes. The alkyl vinyl ethers are chosen such that the alkyl group is substituted or unsubstituted, linear or branched, having between 1 and 20 carbons. The $R^1R^2$ethylene monomers are chosen such that the $R^1$ and $R^2$ substituents independently are hydrogen, or are substituted or unsubstituted $C_1$ to $C_{20}$ alkyl groups.

The following definitions apply herein throughout unless a contrary intention is expressly indicated:

The terms "vinyl aromatic" and "alkenyl benzene" are used interchangeably.

The term "maleic anhydride" encompasses dicarboxylic acids, including maleic anhydride, which can form a copolymer with an alkenyl benzene, an alkyl vinyl ether, or an $R^1R^2$ethylene, the copolymer having monomer units reacted through the dicarboxylic acid which are capable of reaction with an amine functional group.

The term "maleimide" encompasses the reaction product of an amine and a maleic anhydride, described above.

The term "$R^1R^2$ethylene" as used herein encompasses monomer units of the general formula:

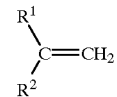

where $R^1$ and $R^2$ are the same or different substituents on the same or different carbon atoms of the ehtylene group, and are selected from hydrogen and substituted $C_1$–$C_{20}$ alkyl groups.

DETAILED DESCRIPTION OF ILLUSTRATIVE EMBODIMENTS

Preferably, the polymer compositions of the present invention generally comprise a backbone formed by copolymerization of a maleic anhydride with a second monomer, such as butadiene, styrene, or methyl vinyl ether. A portion of the maleic anhydride units are imidized with a primary amine. The remaining maleic anhydride units are grafted to a diene rubber via a grafting agent such as an unsaturated amine. The polymer compositions of the present invention preferably contain: 100 parts by weight (pbw) of a grafted polymer of a poly(alkenyl-co-maleimide) having at least one unreacted functional group grafted thereto capable of further reacting with a rubber, about 1 to about 10,000 pbw rubber, and optionally from about 10 to 3,000 pbw of an extender, preferably about 30 to 1000 pbw, such as an oil or a low molecular weight component.

The poly(alkenyl-co-maleimide) used in the formation of the graft copolymer is a centipede polymer formed by imidizing a poly(alkenyl-co-maleic anhydride) with at least one primary amine, preferably at least two different primary amines with a first amine further functionalized with at least one additional functional group capable of graft reacting with a diene rubber and a second amine preferably saturated. The centipede polymer has a high molecular weight spine connected with many relatively short side chains. The length of the main chain usually is longer than the entanglement length, which is herein defined theoretically as an order of magnitude of 100 repeating units. The length of the side chains preferably is smaller than or equal to the entanglement length.

The alkenyl units of the poly(alkenyl-co-maleimide) centipede polymer are polymers formed from vinyl aromatic hydrocarbons, $R^1R^2$ethylenes, alkyl vinyl ethers, and mixtures thereof. Suitable vinyl aromatic hydrocarbons are chosen from the group consisting of styrene, a-methylstyrene, p-methylstyrene, 4-phenylstyrene, m-methylstyrene, p-tert-butylstyrene, dimethylstyrene, and the like. The $R^1 R^2$ethylene contributed units of the centipede polymer contain 4 to about 40 carbon atoms wherein $R^1$ and $R^2$ are the same or different substituents on the same or different carbon atom of the ethylene group, independently selected from hydrogen or unsubstituted and substituted $C_1$–$C_{20}$ alkyl groups. The alkyl vinyl ether contributed monomer units are chosen such that the alkyl group contains about 1 to about 20 carbon atoms in the backbone and may be linear or branched, substituted or unsubstituted along the backbone of the alkyl group. The substituted groups, such as $C_2$–$C_{20}$ alkoxyalkyl groups, are non-reactive with the remaining components of the centipede polymers.

Example of unsubstituted and substituted alkyl groups $R^1$, $R^2$, and alkyl from the alkyl vinyl ether contributed units are independently substituted or unsubstituted alkyl groups containing 1 to about 20 carbons such as methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl, and the like. Preferred alkenyl monomers for forming the poly(alkenyl-co-maleic anhydride) are styrene and isobutylene.

The poly(alkenyl-co-maleimide) copolymers are then graft-reacted through the additional functional group from the first amine to a diene rubber to form the diene-rubber grafted centipede polymer of the present invention. Suitable functional groups include alkenyl, alkynyl, hydroxyl, carboxyl, formyl, amino, cyano, and mixtures thereof.

Poly(alkenyl-co-maleimide) can be formed by reacting under substantially dry conditions, at from about 100° to about 300° C. and from about slightly above vacuum to about 20 atmospheres, a poly(alkenyl-co-maleic anhydride) and at least one primary amine. Preferred polymers of this type are typically formed by reacting a poly(styrene-co-maleic anhydride), poly(isobutylene-co-maleic anhydride), or poly(methyl vinyl ether-co-maleic anhydride) with at least one primary amine. In the present invention, the poly(alkenyl-co-maleic anhydride) is converted to poly(alkenyl-co-maleimide) by reaction with a first amine which is further functionalized with at least one functional group capable of graft reacting to a diene rubber, and, optionally, a second amine which is saturated.

For purposes of this invention, poly(alkenyl-co-maleimide) and poly(alkenyl-co-maleic anhydride) encompass random and stereospecific copolymers, including copolymers having alternating alkenyl-contributed units (i.e., polymer blocks derived from an alkenyl benzene such as styrene) and maleimide- or maleic anhydride-contributed units (i.e., polymer blocks derived from a maleimide or maleic anhydride) along the polymer backbone. Such alternating structures typically are described as poly(alkenyl-alt-maleimide) and poly(alkenyl-alt-maleic anhydride); however, these polymers are encompassed herein within the descriptions poly(alkenyl-co-maleimide) and poly(alkyl-co-maleic anhydride).

Processes for forming poly(alkenyl-co-maleic anhydride) polymers are known. Preparation of copolymers from electron donor monomers such as vinyl aromatic hydrocarbons, $R^1R^2$ethylenes, or alkyl vinyl ethers, and from electron acceptor monomers such as maleic anhydride as a result of complexation of the electron acceptor monomers may be carried out in the absence or presence of an organic free radical initiator in bulk, or in an inert hydrocarbon or halogenated hydrocarbon solvent such as benzene, toluene, hexane, carbon tetrachloride, chloroform, etc.

The poly(alkenyl-co-maleic anhydride) contains from about 5 to 99 mole percent of units derived from maleic anhydride with the remainder being units derived from alkenyl monomer(s). Poly(alkenyl-co-maleic anhydride) preferably contains from 20 to 60 mole percent units derived from maleic anhydride, most preferably 45–55 mole percent units derived from maleic anhydride and 55–45 mole percent units derived from alkenyl monomer(s). The comonomers can be randomly or alternately distributed in the chain, although an alternating distribution along the polymer backbone chain is preferred. The poly(alkenyl-co-maleic anhydride) has a weight average molecular weight ($M_w$) of from about 1,000 to about 500,000 or higher, more typically between about 10,000 and 500,000, and even more typically between about 150,000 and 450,000.

The reactants are preferably dry mixed in the absence of solvents in a suitable mixing apparatus such as a Brabender mixer which preferably has been purged with an inert gas such as nitrogen or argon. The primary amines may be added in a singular charge or in sequential partial charges into a reactor containing a charge of poly(alkenyl-co-maleic anhydride). Preferably, the primary amines are charged in ratio of at least 1.0 moles of amine per 1.0 moles of maleic anhydride in the poly(alkenyl-co-maleic anhydride).

Using two different primary monoamines, a first amine, which is further functionalized with at least one functional group capable of grafting to a diene rubber, and a second amine, which is saturated, such as octylamine and oleylamine, in the preparation of the poly(alkenyl-co-maleimide) is preferred in the present invention. Similarly, the same or different poly(alkenyl-co-maleimides) can be used in the preparation of the grafted poly(alkenyl-co-maleimide)ldiene rubber copolymers.

Suitable primary amines which can serve as the first amine include oleylamine, erucyl erucamide, erucamide, allenylamine, allylamine, amino styrene, vinyl benzyl amine, ethylene diamine, diethylene triamine, triethylene triamine, tetraethylene pentamine, pentaethylene hexamine, xylylene diamine, hexamethylene diamine, polyoxypropylene diamine, polyoxypropylene triamine, polyoxyethylene diamine, polyoxyethylene triamine, and mixtures thereof. The preferred primary amine which can serve as the first amine is oleylamine.

Suitable primary amines which can serve as the second amine, include alkyl amines; alkyl benzyl amines; alkyl phenyl amines; alkoxybenzyl amines; alkyl aminobenzoates; alkoxy aniline; and other linear or branched primary amines containing from 1 to 50 carbon atoms, preferably 6 to 30 carbon atoms, in the alkyl and alkoxy substituents. The alkyl and alkoxy substituents on these primary amines can be linear or branched and saturated or unsaturated; however no aromatic rings may be directly bonded to the amine group. Exemplary amines include hexylamine, octylamine, dodecylamine, and the like.

The first amine is added to the polymer composition in the range of about 1–99% of the total amine concentration, more preferably between about 60–99%. The second amine is added to the polymer composition in the range of about 1–99% of the total amine concentration, more preferably between about 140%.

Grafting of diene rubbers and poly(alkenyl-co-maleimides) is performed by utilizing the additional functional group in the first amine. Suitable functional groups include alkenyl, alkynyl, primary amine, secondary amine, carboxyl, formyl, hydroxyl, cyano, and mixtures thereof. The preferred functional groups are alkenyl, such as those present in unsaturated amines of the general formula:

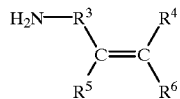

wherein $R^3$, $R^4$, $R^5$, and $R^6$ are the same or different, and are chosen from the group consisting of hydrogen and linear or branched alkyl chains wherein the total number of carbons is not greater than about 40, and mixtures thereof. The poly(alkenyl-co-maleic anhydride) is converted to poly(alkenyl-co-maleimide) by reacting the unsaturated amine simultaneously with, or subsequently to, the saturated amine. The poly(alkenyl-co-maleimide) containing residual pendant groups which are unsaturated is then graft reacted with a suitable diene rubber. The resultant copolymers have superior damping capabilities.

Suitable rubbers include diene rubbers such as isoprene rubber, natural rubbers, EPDM natural rubbers, emulsion polymerized styrene butadiene rubber(SBR), solution-polymerized random SBR (bound styrene content 5–50% by weight, 1,2 bond content in the butadiene units 10–80%), high-trans SBR (trans content in the butadiene units 70–95%), low cis butadiene rubber (BR), high cis BR, styrene isoprene rubber, butadiene-isoprene rubber, solution-polymerized random styrene-butadiene-isoprene copolymer rubber (SIBR), emulsion polymerized SIBR, emulsion polymerized halogenated butyl rubber, ethylene-propylene-diene terpolymer rubber, epichlorohydrin rubber, and block copolymers such as high vinyl SBR-low vinyl SBR-block copolymer rubber, and polystyrene-polybutadiene-polystyrene block copolymer, and mixtures thereof. A particularly preferred combination is a mixture of styrene-butadiene-styrene rubber and butadiene rubber.

A preferred embodiment of the process for preparing the polymer and high damping material of this invention includes the steps of:

a) combining a poly(alkenyl-co-maleic anhydride) and a primary amine, which contains at least one additional functional group capable of grafting, under substantially dry conditions sufficient to react substantially most of the acid anhydride moieties to form a poly(alkenyl-co-maleimide);

b) adding a second amine, which is saturated, to the reaction mixture such that all remaining maleic anhdride moieties are converted to maleimide moieties (this step may be performed concurrently with, or prior to, step a), c) graft reacting the product of steps a and b with a rubber through the first amine, and d) optionally, adding an extender to the polymer composition.

Copolymers such as those of the present invention, can be prepared by any means known in the art such as blending, milling, or internal batch mixing. A rapid and convenient method of preparation involves heating a mixture of the components to a temperature of from about 50° to about 290° C. Such polymers can be made by mixing and dynamically heat-treating the components described above. As for the mixing equipment, any conventional, generally known equipment such as an open-type mixing roll, closed-type Banbury mixer, closed type Brabender mixer, extruding machine, kneader, continuous mixer, etc., is acceptable. Mixing in an inactive gas environment, such as $N_2$, Ar, or $CO_2$, also is preferable.

It is believed that the graft reaction is accomplished by contacting the unreacted functional group from the first amine with a diene rubber, whereupon interaction and crosslinking take place. The functional groups of the first amine react to form covalent chemical bonds with the unreacted double bonds in the diene rubber. The centipede polymer is thus grafted to the diene rubber through covalent chemical functional linkages. The contacting can be accomplished by combining solutions of the polymeric reactants in suitable solvents, such as benzene, toluene, and other inert organic and inorganic solvents, in a suitable reaction vessel. Heating accelerates the reaction and is generally preferred. More preferably, contacting can be accomplished without solvents by premixing pre-formed pellets of the neat functionalized polymers and adding the grafting agent and melt processing in a physical blender or mixer at temperatures of from about 20° to about 350° C., preferably about 50° to about 300° C., most preferably 65° to about 150° C.

A curing agent is preferably added to accelerate the crosslinking reaction between the diene rubber and the polyalkylene grafted centipede polymer. The agent can be any agent known in the art for accelerating the crosslinking reaction, including free-radical and anionic catalysts. The preferred agent is sulfur. Other preferred catalysts include accelerators, such as N-t-butyl-benzothiazole sulfenamine, benzothiazyl disulfide, and tetra-methyl thiuram monosulfide.

Amounts of poly(alkenyl-co-maleimide) and diene rubber reacted into the grafted compositions of the immediate invention may vary somewhat depending upon the properties desired in the finished composition. In general, amounts of diene rubber included in the grafted composition may range from about 1 to about 99 percent by weight based on total weight of composition. Preferred amounts of diene rubber are from 5 to 50% (by wt.) with a particularly preferred amount being from about 10 to 40% (by wt.). The amounts of poly(alkenyl-co-maleimide) centipede polymer included in the grafted composition may range from about 1 to about 99% (by wt.) based on total weight of composition. Preferred amounts of the centipede polymer are from 1 to 40% (by wt.) with a particularly preferred amount being from about 1 to 30% (by wt.). An extender is preferably added in the amount of about 10 to about 90% by weight of the total composition, more preferably about 30–90 wt %.

Preferred Composition Ranges of Polymer Composition

| Component | Parts by weight | Weight Percent |
| --- | --- | --- |
| Diene Rubber | 5–25 | 10–40 |
| Grafted centipede | 1–25 | 1–30 |
| Extender | 10–40 | 30–90 |

In accordance with the present invention, the grafted polymer composition has added thereto extenders such as extender oils and low molecular weight compounds or components. Suitable extender oils include those well known in the art such as naphthenic, aromatic, and paraffinic petroleum oils and silicone oils. Examples of low molecular weight organic compounds or components useful as extenders in the compositions of the present invention are low molecular weight organic materials having a number average molecular weight (Mn) of less than 20,000, preferably less than 10,000, and most preferably less than 5,000. Although there is no particular limitation to the material that may be employed, the following is a list of exemplary appropriate materials:

1) softening agents, namely aromatic naphthenic and paraffinic softening agents for rubbers or resins;
2) plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether, and polyester plasticizers for NBR;
3) tackifiers, namely coumarone resins, coumarone-indene resins, terpene phenol resins, petroleum hydrocarbons, and rosin derivative;
4) oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, SBR, butadiene-acrylonitrile rubber, polychloroprene, etc.), silicone oligomers, and poly($\alpha$-olefins);
5) lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants;
6) petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.
7) accelerators, such as N-t-butyl-benzothiazole sulfenamine, benzothiazyl disulfide, and tetra-methyl thiuram monosulfide; and
8) catalysts capable of catalyzing the curing reaction. Other appropriate low molecular weight organic materials include latices, emulsions, liquid crystals, bituminous compositions, polymers, and phosphazenes. One or more of these materials may be used as extenders.

Polymer compositions produced according to the present invention generally have high damping properties having a tan $\delta$ of at least 0.1, preferably in the range of about 0.1 to about 0.6 over the temperature range of 20 to 50° C.

Frequently, including other additives known in the rubber art to the compositions of the present application can be desired. Stabilizers, antioxidants, conventional fillers, reinforcing agents, reinforcing resins, pigments, fragrances, and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide, and the like. These compounding ingredients are incorporated in suitable amounts depending upon the contemplated use of the product, preferably in the range of 1 to 350 parts of additives or compounding ingredients per 100 parts of grafted copolymer.

A reinforcing material can be defined as a material added to a resinous matrix to improve the strength of the polymer. Most reinforcing materials are inorganic or high molecular weight organic products. Examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products, hydrogenated polystyrene-(medium or high 3,4)-polyisoprene-polystyrene block copolymers, polynorbornenes, and the like. The foregoing materials also can be used in the centipede polymer compositions.

Polymer compositions containing diene rubber grafted poly(alkenyl-co-maleimide) and an oil or low molecular weight component extender can be prepared by any means known in the art for combining such ingredients, such as solution blending, milling, internal batch mixing, or continuous extrusion of a solid form of the centipede polymer and polypropylene compositions and the other ingredients. A rapid and convenient method of preparation involves heating a mixture of the components to a temperature of from about 50° C. to about 290° C.

Polymer compositions containing oil-extended diene rubber grafted poly(alkenyl-co-maleimide) compositions can be manufactured by mixing and dynamically heat treating the components described above. As for the mixing equipment, any conventional equipment such as an open-type mixing roll, closed-type Banbury mixer, extruding machine, kneader, continuous mixer, etc., is acceptable. Mixing in an inactive gas environment, such as $N_2$ or Ar, is also preferable.

The composition of the present invention can be mixed in any conventional mixer such as a Banbury mixer or roll mill or extruder normally conducted at a temperature of from about 120° to about 300° C., preferably maintaining the composition above its melting point for a few minutes up to several hours, preferably 10 to 40 minutes. A particularly useful technique is to add any fillers in the beginning of the mixing cycle to take maximum advantage of heating time and to prevent surface bleeding and overheating when forming the molded articles.

The resultant polymer composition may be molded in appropriate press ovens and the like to form products in the form of extruded pellets, preferably as small as possible since smaller pellets provide short heating times and better flow when utilized in flow molding. Ground pellets may also be utilized.

The extended diene rubber grafted centipede polymers can be used in high temperature applications including uses in injection molding or in any other compositions typically used for elastomeric properties. Of course, molded polymers produced from compositions containing diene rubber grafted poly(alkenyl-co-maleimide) compositions retain elastomeric characteristics and are useful in high temperature applications and/or high damping applications.

A convenient measurement of damping is the parameter tan δ. A forced oscillation is applied to a material at frequency and the transmitted force and phase shift are measured. The phase shift angle delta is recorded. The value of tan δ is proportional to the ratio of energy dissipated to energy stored. The measurement can be made by any of several commercial testing devices, and may be made by a sweep of frequencies at a fixed temperature, then repeating that sweep at several other temperatures, followed by the development of a master curve of tan δ vs. frequency by curve alignment. (An alternate method is to measure δ at constant frequency (such as at 5 Hz) over a temperature range.)

Advantageously, this high degree of absorption of energy can be accompanied by good mechanical and thermal stability. These properties are important because parts made from the subject polymers often are repeatedly cycled through various environments and subjected to various forces of compression, tension, bending, and the like.

The composition of the present invention can be used in the manufacture of any product in which one or more of a high degree of softness, heat resistance, decent mechanical properties, elasticity, and high damping is important. The composition can be used in all industry fields, in particular, in the fabrication of automotive parts, tire tread rubbers, house-hold electrical appliances, industrial machinery, precision instruments, transport machinery, constructions, engineering, and medical instruments.

Representative examples of the use of the extended graft polymers of the present invention are damping materials and vibration restraining materials. These uses involve connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, dryers, printers and ventilator fans. Further, these materials are also suitable for impact absorbing materials in audio equipment and electronic or electrical equipment, sporting goods and shoes. Further, as super low hardness rubbers, these materials are applicable for use in appliances, damping rubbers, and as low hardness plastics, it is preferable for molding materials. Further, because the present compositions can be used to control the release of internal low molecular weight materials out from the compositions, it is useful as a release support to emit materials such as fragrance materials, medical materials and other functional materials. The compositions of the present invention also possess utility in applications of use in liquid crystals, adhesive materials and coating materials.

Specific examples of uses of the compositions of the present invention as damping materials include in audio equipment, such as in insulators for a portable CD or a CD mounted on a vehicle, mike holders for home video cassette recorder, radio cassette recorder, karaoke or handy mike, etc., an edge cone of a speaker, a tape holder of a radio cassette, a holder of a portable mini-disk player, an optical disk holder of a digital video disk, etc.;

in information relating equipment, such as in insulators for a hard disk, insulators for motors such as a spindle motor for HHD and stepping motor, insulators for floppy disk drive, insulators for CD-ROM of personal computer, and a holder for optical disk;

in communication equipment, such as in a holder for compact high performance mike or speaker of a portable telephone, a pocket bell or PHS, a microphone holder for a wireless equipment, and a disk holder for portable note type electronic equipment;

in home electronics equipment, such as in insulators for CD-ROM of home TV game, insulators for cassette holder or CD-ROM of cassette holder or game machine, a holder of high performance mike, and cone edge of speaker; and in other applications, such as in damping materials for printer head of a word processor, printer of personal computer, small or middle handy type printer, or name printers, and insulators for CD-ROM used for measure equipment.

The present invention is described in more detail with reference to the following non-limiting examples.

EXAMPLES

Example 1

Preparation of Centipede Polymers

To a 6 L kneader-extruder (MXE-6, Jaygo, Inc.) equipped with sigma blades was added 1.36 kg of poly(maleic anhydride-alt-styrene) (Scripset 520™, Monsanto), 771 g of octylamine (99%, Aldrich), and 167.82 g of oleylamine (Aldrich) at 65° C. The mixing was started with the blade speed of 25 rpm and the screw speed of 66 rpm for 10 minutes, then 1000 mL water was added. The mixing was continued for another 10 minutes over which the temperature was raised to 100° C. The vapor generated was vented through a ¼ inch pore at the top lid of the mixer. Ten minutes later, the temperature of the mixer was adjusted to rise to 200° C. at a rate of about 3° C. per minute. The mixing was further continued for 2 more hours isothermally at 200° C.

Then, the temperature was readjusted to 100° C. About 10 g of the product was taken out of the mixer and was analyzed by FTIR. No trace of maleic anhydride absorption peaks, i.e., at 1779 and 1855 cm$^{-1}$ and amino-group peaks, i.e., at 3330 cm$^{-1}$ were seen, which is indication that the product was fully reacted. Then, 1.36 kg of DTDP oil (C.P. Hall Co.) was added to the mixer. After 30 minutes, the final product was extruded through a ¼ inch die.

Example 2–7
Diene Rubber Grafted Poly(isobutylene-alt-n-alkylmaleimide)

Six kinds of rubber compositions were prepared according to the formulations shown in Table 1 by selectively using the centipede polymer (product of example 1) to replace partially the amount of aromatic oil, or the amount of butadiene rubber, or to be added into the composition as an excess, as shown in table 3. The styrene butadiene rubber used was an oil extended high-styrene SBR (20.4 parts per hundred parts by weight (phr) aromatic oil) which contains 33% bound styrene with a $T_g$=−47° C. The cis-BR used was a high-cis polybutadiene with cis content =96%. In each sample, a blend of the ingredients was kneaded by a method listed in Table 2. A 310 g Brabender mixer was set to a temperature of 110° C. and the stir speed was set to 60 rpm. Styrene butadiene rubber (SBR, Duradene 753) and butadiene rubber (cis-BR, Diene 600) were first added to the mixer. After 30 seconds, Carbon Black (ISAF), aromatic oil, stearic acid (processing aid), wax, and [N-(1,3-dimethylbutyl)-N'-phenyl-p-phenylene-diamine], an antioxidant, were added the the mixer. After five minutes, the mixture was taken out from the mixer. The temperature of the mixer was cooled and reset to 110° C. The mixture was returned to the mixer, stirred for an additional 4 minutes at 110° C., then cooled to 75° C. The centipede polymer was then added to the mixture, along with the curing catalysts listed in Table 1. The mixture was blended for 80 seconds, then the temperature was cooled. The final stock was then sheeted and molded at 165° C. for ~15 minutes.

On the vulcanized rubber compounds of Example 2–7, measurement of the tensile strength, tear strength, and hysteresis loss gave results shown in Table 4. Measurement of tensile strength was based on conditions of ASTM-D 412 at 22° C. Test specimen geometry was taken in the form of a ring of a width of 0.05 inches and of a thickness of 0.075 inches. The specimen was tested at a specific gauge length of 1.0 inches. The measurement of tear strength was based on conditions of ASTM-D 624 at 170° C. Test specimen geometry was taken in the form of a nicked ring (ASTM-624-C). The specimen was tested at the specific gauge length of 4.445 cm. The hysteresis loss was measured with a Dynastat Viscoelastic Analyzer. Test specimen geometry was taken in the form of a strip of a length of 30 mm and with a width of 15 mm. Testing conditions of 5 Hz frequency and 0.5% strain were used.

As can be seen in Table 4, the rubber compositions of Examples 2–7 exhibited well balanced tensile strength, tear strength, and damping properties. The tensile strength and damping properties of the modified rubber compounds ie, the compounds that contain the grafted polymer from example 1, were better that that of the comparative compounds (example 2-utilizing oil and butadiene rubber) if the consideration was based on the same modulus conditions. Accordingly, the polymers developed are suitable as high damping additives in rubber compounds, and the said polymers can be used as alternatives for oils or plasticizers.

The invention has been described with reference to the preferred embodiment. Obviously, modifications and alterations will occur to others upon reading and understanding the preceding, detailed description. It is intended that the invention be construed as including all such modifications and alterations insofar as they come within the scope of the appended claims or the equivalents thereof.

TABLE 1

Composition of Representative Diene-Rubbers Prior to Addition of Product of Example 1 (in parts)

| | |
|---|---|
| Styrene Butadiene Rubber (SBR, Duradene 753) | 96.80 |
| Butadiene Rubber (cis-BR, Diene 600) | 20.00 |
| Carbon Black (ISAF) | 70.00 |
| Aromatic Oil | 18.25 |
| Stearic Acid (processing aid) | 2.00 |
| Wax (processing aid and protects against ozone oxidation) | 1.50 |
| Antioxidant [N-(1,3-dimethylbutyl)-N'-phenyl-p-phenylene-diamine] | 0.95 |
| Curing Catalysts: | |
| Sulfur | ~1.70 |
| Accelerator [N-t-butyl-benzothiazolesulfenamine] | 0.80 |
| Zinc oxide | 2.00 |
| Antioxidant [polymerized 1,2-dihydro-2,2,4-trimethylquinoline] | 0.22 |
| Accelerator (benzothiazyl disulfide) | 0.20 |
| Accelerator (tetra-methylthiuram monosulfide) | 0.20 |

TABLE 2

Reaction Conditions for Representative Grafting Reaction

| | |
|---|---|
| Mixer | 310 g Brabender |
| Agitation Speed | 60 rpm |
| Master Batch Stage | |
| Initial Temperature | 110° C. |
| 0 seconds | Charge polymers |
| 30 seconds | Charge carbon black and all pigments |
| 5 minutes | Cool temperature |
| Remill Batch Stage | |
| Initial Temperature | 110° C. |
| 0 seconds | Charge master batch stock |
| 4 minutes | Cool temperature |
| Final Batch Stage | |
| Initial Temperature | 75° C. |
| 0 seconds | Charge remilled stock and centipede polymer |
| 30 seconds | Charge curing agent and accelerators |
| 80 seconds | Cool temperature |

TABLE 3

Relative Amounts of Extender, Rubber, and Centipede Polymer in Examples 2-7

| Example No | Oil Content (parts) | BR Content (parts) | Ex. 1 Content (parts) |
|---|---|---|---|
| 2 (comp) | 35.05 | 20 | 0 |
| 3 | 30.05 | 20 | 5 |
| 4 | 27.05 | 20 | 8 |
| 5 | 20.05 | 20 | 15 |
| 6 | 35.05 | 10 | 10 |
| 7 | 35.05 | 20 | 10 |

TABLE 4

Physical Characteristics of Copolymers From Examples 2–7

| Example No | Modulus at 23° C., at 300% elongation (lbs/in) | Tensile Strength at 23° C. (psi) | Maximum Elongation at 23° C. (%) | Tear Strength at 170° C. (lbs/in) | Travel at tear, at 170° C. (%) | tan δ at 23° C. | tan δ at 50° C. |
|---|---|---|---|---|---|---|---|
| 2 comp | 1250 ± 54 | 2724 ± 26 | 537 ± 23 | 274 ± 15 | 455 ± 15 | .1915 | .1650 |
| 3 | 1437 ± 24 | 3075 ± 181 | 538 ± 35 | 271 ± 23 | 446 ± 25 | .1955 | .1585 |
| 4 | 1362 ± 8 | 2982 ± 74 | 552 ± 14 | 266 ± 28 | 431 ± 31 | .1954 | .1769 |
| 5 | 1627 ± 36 | 3147 ± 107 | 511 ± 8 | 211 ± 30 | 343 ± 33 | .1887 | .1875 |
| 6 | 1429 ± 13 | 2790 ± 130 | 506 ± 16 | 240 ± 18 | 413 ± 23 | .2028 | .1996 |
| 7 | 1118 ± 41 | 2798 ± 26 | 590 ± 24 | 257 ± 15 | 489 ± 32 | .2014 | .1953 |

We claim:

1. A method for forming a diene-rubber grafted centipede polymer, comprising:
   A. the copolymerization of:
      i. a copolymer comprising a maleimide and at least one other monomer unit chosen from the group consisting of:
         a. vinyl aromatic hydrocarbons,
         b. $R^1R^2$ethylenes, in which $R^1$ and $R^2$ independently are substituted or unsubstituted $C_1$ to $C_{20}$ alkyl groups having between 1 and 40 carbon atoms, and
         c. alkyl vinyl ethers, in which the alkyl group is substituted or unsubstituted, having between 1 and 40 carbons, and mixtures thereof; and
      ii. an amine which is further functionalized with at least one additional functional group capable of grafting to a diene rubber; and
   B. co-curing the product of step A with a diene rubber to form the diene-rubber grafted centipede polymer.

2. The method of claim 1, wherein step A further comprises copolymerizing the copolymer and the first amine with a second amine which is saturated.

3. The method of claim 2, wherein said first amine is added in the range of 1–99% and said second amine is added in the range of 1–99% of the total amine concentration.

4. The method of claim 2, wherein said first amine is added in the range of about 1–40% and said second amine is added in the range of 60–99% of the total amine concentration.

5. The method of claim 1, further including adding an extender to the diene-rubber grafted centipede polymer.

6. The method of claim 5, wherein said extender is selected from the group consisting of softening agents, plasticizers, tackifiers, oligomers, lubricants, petroleum hydrocarbons, silicone oil, aromatic oil, naphthenic oil and paraffinic oil, and combinations thereof.

7. The method of claim 1, wherein step B includes mixing about 1 wt % to about 99 wt % of said product of step A with a total amount of about 99 wt % to about 1 wt % of the diene rubber.

8. The method of claim 7, wherein step B includes mixing about 1 wt % to about 40 wt % of the product step A with a total amount of about 1–50 wt % of the diene rubber, followed by the addition of 30–90 wt % extender.

9. The method of claim 2, wherein said copolymerization includes:
   a. reacting the copolymer with the second amine, which is saturated; and
   b. reacting the product of said copolymerization with the first amine.

10. The method of claim 1, wherein said copolymerization is carried out in the absence of a solvent.

11. The method of claim 1, wherein said amine has the general formula:

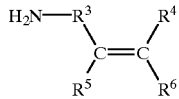

wherein $R^3$, $R^4$, $R^5$, and $R^6$ are the same or different, and are chosen from the group consisting of hydrogen, and linear or branched alkyl chains wherein the total number of carbons is not greater than about 40, and mixtures thereof.

12. The method of claim 1, wherein said amine is selected from the group consisting of oleylamine, erucyl erucamide, erucamide, allylamine, amino styrene, vinyl benzyl amine, ethylene diamine, diethylene triamine, triethylene triamine, tetraethylene pentamine, pentaethylene hexamine, xylylene diamine, hexamethylene diamine, polyoxypropylene diamine, polyoxypropylene triamine, polyoxyethylene diamine, polyoxyethylene triamine, and mixtures thereof.

13. A method for forming a grafted polymer, comprising:
   A. copolymerizing:
      a) a copolymer comprising a maleimide and at least one other monomer unit chosen from the group consisting of:
         i. vinyl aromatic hydrocarbons,
         ii. $R^1R^2$ethylenes, in which $R^1$ and $R^2$ independently are substituted or unsubstituted $C_1$ to $C_{20}$ alkyl groups having between 1 and 40 carbon atoms, and
         iii. alkyl vinyl ethers, in which the alkyl group is substituted or unsubstituted, having between 1 and 40 carbons, and mixtures thereof; and
      b) oleylamine, and
   B. adding a diene rubber to the product of step A to form the grafted polymer.

14. The method of claim 1, wherein said vinyl aromatic hydrocarbon is selected from the group consisting of: styrene, α-methylstyrene, p-methylstyrene, 4-phenylstyrene, m-methylstyrene, o-methylstyrene, p-tert-butylstyrene, dimethylstyrene, and mixtures thereof.

15. The method of claim 1, wherein $R^1$, $R^2$, and alkyl are selected from the group consisting of methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyoctyl, methoxynonyl, ethoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyheptyl, propoxyoctyl, propoxynonyl, propoxydecyl, butoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyoxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, oxtyloxyethyl, octyloxypropyl, octyloxybutyl, octyloxypentyl, octyloxyhexyl, octyloxyheptyl, octyloxyoctyl, oxtyloxynonyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methyinonyl, 1-methyldecyl, 2-methylpropyl, 2-methylbutyl, 2-methylpentyl, 2-methylhexyl, 2-methylheptyl, 2-methyloctyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl, and combinations thereof.

16. The method of claim 2, wherein the second amine is a primary amine selected from the group consisting of: alkyl amines; alkyl benzyl amines; alkyl phenyl amines; alkoxy-benzyl amines; alkyl aminobenzoates; and alkoxy aniline; containing from 1 to 50 carbon atoms in the alkyl and alkoxy substituents in the primary amine.

17. The method of claim 1, wherein step B is carried out in the absence of a solvent.

18. The method of claim 1, wherein said diene rubber is selected from the group consisting of isoprene rubber, natural rubbers, EPDM, emulsion polymerized styrene butadiene rubber (SBR), solution polymerized random SBR, high-trans SBR, low cis butadiene rubber (BR), high cis BR, styrene isoprene rubber, butadiene-isoprene rubber, solution polymerized random styrene-butadiene-isoprene copolymer rubber (SIBR), emulsion polymerized SIBR, emulsion polymerized halogenated butyl rubber, epichlorohydrin rubber, and block copolymers, including high vinyl SBR-low vinyl SBR-block copolymer rubber and polystyrene-polybutadiene-polystyrene block copolymer, and mixtures thereof.

19. A co-curable rubber composition comprising:
a diene rubber; and
a copolymer comprising:
at least one monomer unit of maleimide formed from the reaction of maleic anhydride with an unsaturated amine, and
at least one monomer unit chosen from the group consisting of vinyl aromatic hydrocarbons, alkyl vinyl ethers in which the alkyl group is substituted or unsubstituted, having between 1 and 40 carbons, and $R_1(R_2)$ethylene monomers, in which $R_1$ and $R_2$ independently are hydrogen or substituted or unsubstituted $C_1$ to $C_{20}$ alkyl groups.

20. The co-curable composition of claim 19, further including monomer units formed from the reaction of maleic anhydride with a saturated amine.

21. The co-curable composition of claim 19, wherein the composition, when cured, has a tan δ of at least 0.18.

22. A co-curable rubber composition comprising:
a. a diene rubber,
b. a copolymer comprising a maleic anhydride unit, and at least one other unit chosen from the group consisting of vinyl aromatic hydrocarbons, $R^1R^2$ethylenes, and alkyl vinyl ethers,
c. a saturated amine, and
d. an unsaturated amine.

23. The composition of claim 19 wherein said unsaturated amine comprises oleylamine.

24. The composition of claim 22 wherein said unsaturated amine comprises oleylamine.

25. A diene-rubber grafted polymer, comprising:
a copolymer which is grafted to the diene rubber using an amine having a functional group capable of grafting to the diene rubber, the copolymer comprising a maleimide and a least one other monomer unit chosen from the group consisting of:
a) vinyl aromatic hydrocarbons,
b) $R^1R^2$ethylenes, in which $R^1$ and $R^2$ independently are substituted or unsubstituted $C_1$ to $C_{20}$ alkyl groups having between 1 and 40 carbon atoms, and
c) alkyl vinyl ethers, in which the alkyl group is substituted or unsubstituted, having between 1 and 40 carbons, and mixtures thereof.

* * * * *